United States Patent [19]

Takahashi et al.

[11] Patent Number: 4,474,696
[45] Date of Patent: Oct. 2, 1984

[54] REACTIVE DISAZO DYESTUFFS CONTAINING TRIAZINES

[75] Inventors: Setsuzo Takahashi, Tokyo; Hideo Inoue, Omiya; Hideo Otake, Tokyo; Hiroshi Senoo, Fukuyama, all of Japan

[73] Assignee: Nippon Kayaku Kabushiki Kaisha, Tokyo, Japan

[21] Appl. No.: 156,041

[22] Filed: Jun. 3, 1980

[30] Foreign Application Priority Data

Dec. 29, 1975 [JP] Japan .................................. 158286

Related U.S. Application Data

[63] Continuation of Ser. No. 754,881, Dec. 27, 1976, abandoned.

[51] Int. Cl.³ .................... C09B 62/09; D06P 1/382; D06P 3/66
[52] U.S. Cl. ..................................... 260/153; 260/196
[58] Field of Search ........................... 260/146 T, 153

[56] References Cited

U.S. PATENT DOCUMENTS

| | | | |
|---|---|---|---|
| 3,118,869 | 1/1964 | Berrie et al. | 260/153 |
| 3,261,825 | 7/1966 | Lesslie et al. | 260/153 |
| 3,639,662 | 2/1972 | Griffiths et al. | 260/146 T |
| 3,647,778 | 3/1972 | Andrew et al. | 260/153 |
| 3,658,782 | 4/1972 | Griffiths et al. | 260/153 |
| 3,664,995 | 5/1972 | Andrew et al. | 260/146 T |
| 3,826,799 | 7/1974 | Waring | 260/146 T |
| 3,966,705 | 6/1976 | Oesterlein et al. | 260/153 |

Primary Examiner—Floyd D. Higel
Attorney, Agent, or Firm—Henry C. Nields

[57] ABSTRACT

Reactive azo dyestuffs which, in the form of free acid, are represented by the following formula:

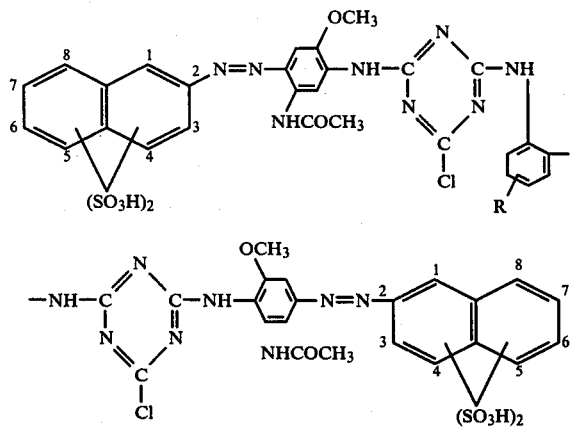

(wherein R is hydrogen or methyl) are characterized by exhibiting the following properties: high fixation efficiency, excellent wash-off, high build-up and excellent wet fastness. Such dyestuffs give dyeings excellent in light fastness, chlorine fastness and color yield.

4 Claims, No Drawings

REACTIVE DISAZO DYESTUFFS CONTAINING TRIAZINES

DETAILED DESCRIPTION OF THE INVENTION

This is a continuation of application Ser. No. 754, 881 filed Dec. 27, 1976, now abandoned.

The present invention relates to a reactive azo dyestuff which, in the form of free acid, is represented by the following formula:

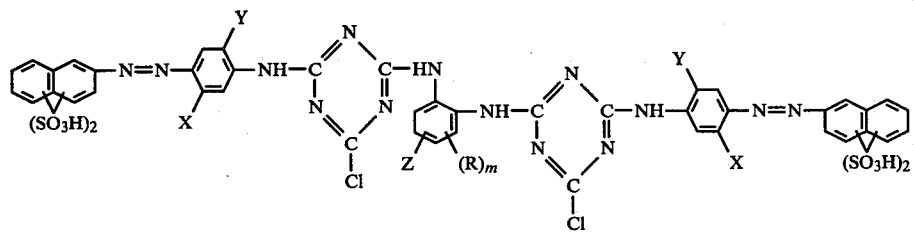

(1)

wherein X is a methyl, methoxy, acetylamino, ureido or carbethoxyamino group; Y is a hydrogen atom, a methyl or methoxy group; Z is a hydrogen atom, a sulfonic acid or carboxylic acid group; R is a hydrogen or chlorine atom, a methyl or methoxy group; and m is a integer of 1 or 2. Hereinafter, all the starting materials and products referred to in the present invention are represented in the form of free acid.

The dyestuff of the invention, represented by formula (1), can be obtained by reacting 2 moles of cyanuric chloride with 2 moles of an aminoazo compound represented by the formula;

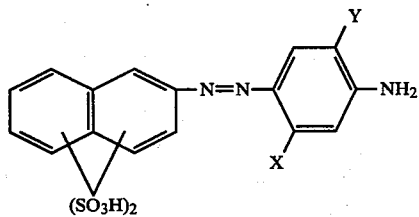

(2)

wherein X and Y are as defined above, and 1 mole of a diamine represented by the formula;

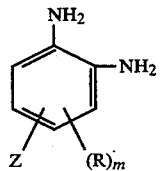

(3)

wherein Z, R and m are as defined above, in an arbitrary order.

Hitherto, there have been known monohalogeno triazine dyestuffs obtained by condensing 1 mole of cyanuric chloride with 1 mole of a compound of formula (2) and 1 mole of an amine or an alcohol. However, this type of dyestuff is disadvantageous in that the halogenotriazine reactive group reacts not only with the cellulose molecule but also with water to leave a considerable amount of the dyestuff non-fixed to the fiber, that in the subsequent soaping stage the non-fixed dyestuff cannot be washed off effectively from cellulose fibers and that consequently the dyeings obtained are poor in wet fastness.

There have been also known bis (monohalogenotriazine) type of dyestuffs which is obtained by reacting 2 moles of a dihalogenotriazine dyestuff with 1 mole of a diamine. However, among such type of dyestuffs, the dyestuffs which are obtained by using an aminoazo compound of formula (2) and a conventional diamine have a high affinity to fiber materials, so that the non-fixed amount of the dyestuff cannot be soaped out effectively and the dyeings are quite poor in wet fastness. Thus, it has been desired earnestly to develop new dyestuffs free from the above-mentioned draw-backs. In view of above, the present inventors have conducted extensive studies to discover the following fact. According to the discovery of the present inventors, surprisingly, bis (monochlorotriazine) type dyestuffs of formula (1) obtained by using an aminoazo compound of formula (2) with a diamine of formula (3) are first of all characterized by exhibiting a high fixation efficiency an excellent wash-off property, a high build-up property and an excellent wet fastness and, give dyeings excellent in light fastness, chlorine fastness and color yield.

The manufacture of the dyestuffs of the invention represented by formula (1) can be practised by one of the following processes:

(I) Cyanuric chloride is suspended in an aqueous medium, and mixed with an aminozao compound of formula (2). The resulting mixture is stirred preferably at a temperature of 0° to 20° C., particularly at a temperature of 0° to 5° C., until one chlorine atom attached to cyanuric chloride has been substituted by the residue of said aminoazo compound. Subsequently, a diamine of formula (3) is added and the resulting mixture is reacted until the second chlorine atom of triazine nucleus has reacted with the amino group at a little elevated temperature, preferably at 40° to 70° C. and particularly at 50° to 55° C.

(II) At a low temperature, cyanuric chloride is reacted with a diamine of formula (3) in an aqueous medium or, if necessary, in an organic solvent to yield a bis (dichlorotriazine) derivative. Subsequently, the latter is reacted with an aminoazo compound of formula (2) at a higher temperature. Advisably, the condensation reactions in processes (I) and (II) are practised in a preferable pH range of 4 to 8.5 by adding an acid binding agent in order to neutralize the hydrochloric acid formed in the reaction. As examples of the acid binding agents usable in the invention there may be mentioned sodium carbonate, sodium hydroxide, sodium metaphosphate, trisodium phosphate, sodium metasilicate, sodium orthosilicate, and the like. After completion of the reaction, the formed reactive azo dyestuff is isolated by the conventional method adopted in the isolation of water-soluble reactive dyestuffs such as salting out and filtration or by spray-drying the reaction mixture.

The aminoazo compounds of formula (2) are prepared by diazotating a 2-aminonaphthalene-disulfonic acid represented by the formula;

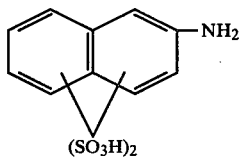
(4)

by the conventional process, followed by coupling it by the conventional process with coupling component of the formula;

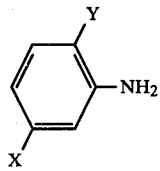
(5)

wherein X and Y are as defined above. Examples of the compounds of formula (4) herein used include the following:
2-Aminonaphthalene-4,8-disulfonic acid,
2-Aminonaphthalene-5,7-disulfonic acid,
2-Aminonaphthalene-6,8-disulfonic acid,
2-Aminonaphthalene-3,6-disulfonic acid, and the like.
Suitable compounds of formula (5) include m-toluidine, m-anisidine, 3-acetylaminoaniline, 3-aminophenylurea, 2-methoxy-5-acetylaminoaniline, 3-carbethoxyaminoaniline, 2-methoxy-5-methylaniline, 2,5-dimethylaniline and the like. As examples of suitable diamines of formula (3) used in the invention there may be mentioned 0-phenylenediamine, 0-phenylenediamine-4-sulfonic acid, 3,4-diaminotoluene, 3,4-diaminotoluene-6-sulfonic acid, 3,4-diaminoanisole, 3,4-diaminobenzoic acid, 3,4-diamino-1-chlorobenzene, 3,4-diamino-0-xylene, and the like.

Example of the cellulosic fibers to which the dyestuffs of the invention are applicable include cellulose fibers such as cotton, linen, viscose rayon, viscose staple fiber and the like as well as their blended fabrics, union cloths and union knitted cloths.

The dyeing process can be applied to cellulose fibers by a wide variety of methods including usual dipdyeing, printing and padding. The acid binding agents which can be used in the dyeing process of the invention include, for example, sodium hydrogen carbonate, sodium metaphosphate, trisodium phosphate, sodium orthosilicate, sodium metasilicate, sodium carbonate, sodium hydroxide and the like. In applying the dyestuff of the invention to a dyeing treatment having a relatively long liquor-to-goods ratio such as a batch dyeing process, the first stage of dyeing is carried out at 30° to 100° C. for 10 to 60 minutes in a bath containing the dyestuff and an inorganic salt such as sodium chloride or sodium sulfate and in the second stage an acid binding agent is added to the bath in which the dyeing is carried out at 60° to 100° C. for 20 to 60 minutes.

Alternatively, an acid binding agent may be added to the bath at the beginning of the dyeing process. Otherwise, it is also permitted to carry out the dyeing under a neutral condition and thereafter fix the dyestuff in another bath containing an acid binding agent and an inorganic salt.

When the dyestuff of the invention is applied to a dyeing treatment having a relatively shorter liquor-to-goods ratio such as a continuous dyeing process or semi-continuous dyeing process, the dyebath is usually prepared by using the dyestuff, an acid binding agent, a penetrant and, if necessary, urea. In this case fibers are immersed in the bath for a short time and then squeezed, and it is allowed to stand still at room temperature or an elevated temperature, or subjected to the steam heating or dry heating treatment for a short time.

Alternatively, fibers may preliminarily immersed into a solution of an acid binding agent and then padded in a neutral dyebath. Otherwise, fiber preliminarily padded with a neutral dyebath may be treated with a solution of an acid binding agent saturated with an inorganic salt and then allowed to stand still or subjected to the heat treatment. When the dyestuff of the invention is applied to a printing treatment, a color paste is prepared by incorporating the dyestuff, an acid binding agent, urea and the like with paste base composed of sodium alginate, emulsion paste or the like, a fiber material is printed with the color paste, it is subjected to intermediate drying, and then it is subjected to the heat treatment or allowed to stand still at room temperature or an elevated temperature until the dyestuff has been fixed. If necessary, it is also permitted to impregnate fiber materials preliminarily with a solution of an acid binding agent and then print the fiber material with a neutral color paste and allow it to stand still or subject to the heat treatment.

The fiber material colored by means of dip-dyeing, padding or printing in the above-mentioned manner is subsequently rinsed with water or subjected to soaping in a hot bath containing a surfactant, if necessary.

When the novel azo dyestuffs of the invention represented by the aforesaid formula (1) are used for dyeing cellulose fibers in the presence of an acid binding agent, there is obtained deeply yellow or reddish yellow colored dyeings or prints exhibiting a high fixation efficiency and excellent wash-off property and having quite excellent fastnesses such as light fastness, chlorine fastness and particularly wet fastness.

Among the dyestuffs of the invention, the dyestuffs represented by the following formula:

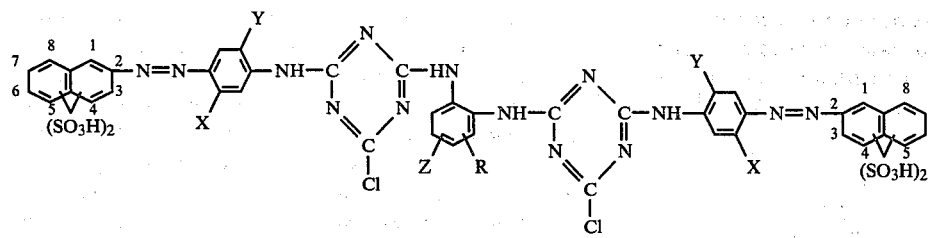

wherein X is a methyl, methoxy, acetylamino or ureido group; Y representes a hydrogen atom when X is a methyl or methoxy group, and Y represents a hydrogen atom or a methoxy group when X is an acetylamino or ureido group; Z is a hydrogen atom or a sulfonic acid group; R is a hydrogen atom, a methyl or methoxy group; and the sulfonic acid groups attached to the naphthalene nuclei are in the position of 4,8-, 5,7-, or 6,8-; are particularly suitable for dyeing cellulose fiber materials in exhibiting a high fixation efficiency and giving dyeings or prints of excellent light fastness, chlorine fastness, and particularly excellent wet fastness and wash-off property.

The following examples will illustrate the invention. In the example, all parts and % are by weight and all the starting materials and products are presented in the form of free acid.

EXAMPLE 1

9.9 parts of the aminoazo compound of the following formula:

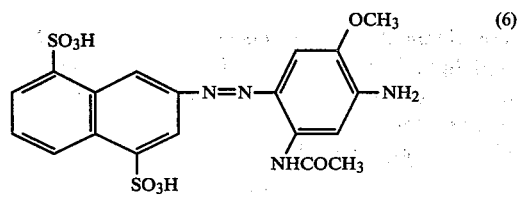

was dissolved into 250 parts of water, while neutralizing it with sodium hydroxide. While keeping the solution temperature at 0° to 5° C. by adding crushed ice, 0.2 part of a dispersing agent was added and with stirring, 3.7 parts of cyanuric chloride was added. After the mixture was stirred for 30 minutes, a 10% solution of soda ash was slowly added to elevate pH of the reaction mixture to 6. Then, while keeping the mixture at a temperature of 0° to 5° C. at a pH value of 5 to 7, the condensation reaction proceeded.

After completion of the reaction was confirmed, a neutral solution of 1.1 part of 0-phenylenediamine in 50 parts of water was added and the resulting mixture was reacted at 50° to 55° C. while keeping pH value in the range of 6 to 8 by adding a 10% solution of soda ash. After completion of the reaction was confirmed, the product was salted out with sodium chloride, collected by filtration and dried at below 80° C.

The dyestuff thus obtained had the following formula:

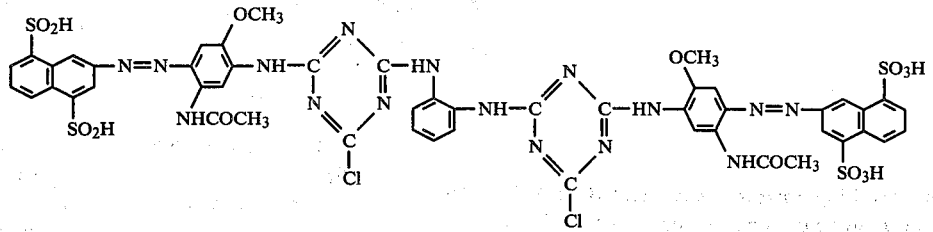

When it was used for dyeing cellulose fiber materials, it exhibited very high fixation efficiency, and excellent wash-off and gave deeply reddish yellow colored dyeings which were quite excellent in light fastness, chlorine fastness and particularly wet fastness.

EXAMPLE 2

A dyebath was prepared from 2 parts of the dyestuff of formula (7) obtained according to Example 1, 40 parts of anhydrous sodium sulfate and 1,000 parts of water.

50 parts of spun rayon yarn was immersed into the dyebath and treated at 80° C. for 30 minutes, and then 10 parts of sodium carbonate was added and the yarn was dyed at the same temperature as above for subsequent 60 minutes.

Then, the yarn was rinsed with water, soaped, rinsed with water and dried in the same manner as in Example 1. Thus, there was obtained deeply reddish yellow colored dyeings which had a high light fastness, a high chlorine fastness and particularly so excellent a wet fastness as a rating of 4–5 or more of staining on cotton in the washing fastness test at 70° C. according to JIS L-0884 A-4.

EXAMPLE 3

40 parts of 3,4-diaminotoluene-6-sulfonic acid was dissolved into 60 parts of water so as to give a neutral solution by use of a 10% solution of soda ash. While keeping temperature of the solution at 0° to 5° C. by adding crushed ice, 0.2 part of a dispersing agent was added and with stirring 7.9 parts of cyanuric chloride was added to the solution. While keeping pH of the reaction mixture at 6 to 7 by neutralizing it with a 10% solution of soda ash, it was constantly stirred at 0° to 5° C. After completion of the reaction was confirmed, the excessive cyanuric chloride was removed by filtration, and the filtrate was combined with a neutral solution of 16.0 parts of the aminoazo compound of formula (8) in 400 parts of water.

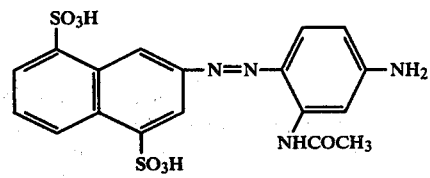

(8)

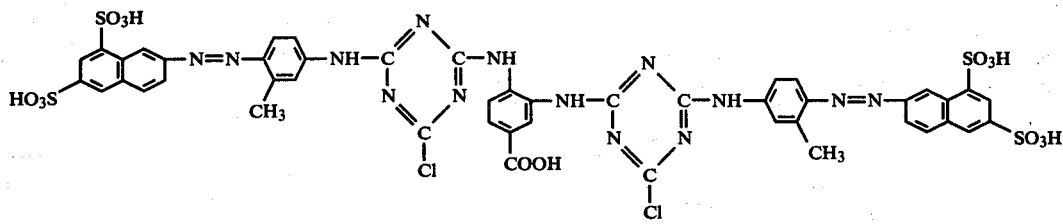

(10)

The resulting mixture was reacted at 50° to 55° C., while adjusting its pH value to 6.5 to 7.5 with a 10% solution of soda ash.

After completion of the reaction was confirmed, the product was salted out with sodium chloride, collected by filtration and dried at below 80° C.

The dyestuff thus obtained had the following formula:

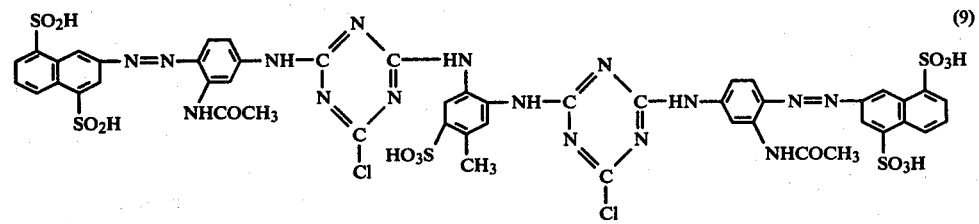

(9)

When it was used for dyeing cellulose fibers, it exhibited a very high fixation efficiency and excellent wash-off property and gave deeply yellow colored dyeings which were quite excellent in light fastness, chlorine fastness and particularly wet fastness.

EXAMPLE 4 parts of sodium carbonate was added and the fabric was dyed at the same temperature for 60 minutes. Subsequently, it was rinsed with water, soaped at 95° to 100° C. for 10 minutes by using 1,000 parts of an aqueous solution containing 2 parts of an anionic surfactant, again rinsed with water and dried. Thus, there was obtained a deeply yellow colored dyeing having a high light fastness, a chlorine fastness and particularly so excellent a wet fastness as a rating of 4-5 or more of staining on cotton in washing fastness test at 70° C. according to JIS L-0844 A-4.

EXAMPLE 5

There were prepared 1,000 parts of a dyestuff solution containing 20 parts of the dyestuff of formula (10), 1 part of sodium alginate and 20 parts of sodium carbonate. A cotton cloth was passed through this padding bath and squeezed with a padder so as to weigh 1.7 times greater than the initial weight. After an intermediate drying at 100° C. for 2 minutes, it was subjected to heat treatment at 170° C. for 2 minutes. Then, it was rinsed with water, soaped, again rinsed with water and dried in the same manner as in Example 1. Thus, there was obtained a deeply yellow colored dyeing having a high light fastness, a high chlorine fastness and particularly so excellent a wet fastness as a rating of 4-5 or more of staining on cotton in washing fastness test at 70° C. according to JIS L-0844 A-4.

EXAMPLE 6

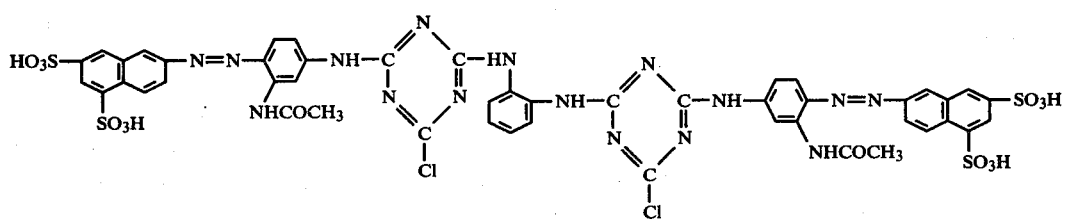

(11)

A dyebath was prepared from 2 parts of the dyestuff of formula (9) obtained according to Example 3, 80 parts of anhydrous sodium sulfate and 1,000 parts of water. 50 parts of cotton knitted fabric was immersed in the dyebath and treated at 80° C. for 30 minutes, 20

20 parts of the dyestuff of formula (11) was mixed with 100 parts of urea. 380 parts of hot water was added to the resulting mixture to dissolve the dyestuff. The dyestuff solution thus obtained was added to 500 parts of 5% sodium alginate aqueous solution containing 40 parts of Polymine L New (anti-reducing agent manufactured by Nippon Kayaku K.K.) and 40 parts of sodiumbicarbonate and thoroughly homogenized to give a color paste. A cotton cloth was printed with the color paste by means of a screen, intermediately dried at 50° to 60° C., subjected to steaming treatment at 100° to 103° C. for 10 minutes and then rinsed with water, soaped, rinsed with water and dried in the same manner as in Example 1. Thus, there was obtained a deeply yellow colored print having a high light fastness, a high chlorine fastness and particularly so excellent a wet fastness as a rating 4–5 or more of staining on cotton in washing fastness test at 70° C. according to JIS L-0844 A-4.

EXAMPLES 7 to 24

The dyestuffs presented in the following table were prepared by repeating the procedure of Example 1 or Example 3.

All these dyestuffs resembled the above-mentioned dyestuffs in that, when used for dyeing cellulose fiber materials, they exhibited quite high fixation efficiencies and excellent wash-off properties as well as in that they gave deep colored dyeings or prints which were quite excellent in light fastness, chlorine fastness and particularly in wet fastness.

| Example | Formula | Color shade on cellulose fiber |
| --- | --- | --- |
| 7 | | Yellow |
| 8 | | Yellow |
| 9 | | Reddish Yellow |
| 10 | | Reddish Yellow |
| 11 | | Yellow |

| Example | Formula | Color shade on cellulose fiber |
|---|---|---|
| 12 | (structure) | Yellow |
| 13 | (structure) | Reddish Yellow |
| 14 | (structure) | Yellow |
| 15 | (structure) | Yellow |
| 16 | (structure) | Yellow |
| 17 | | Yellow |

| Example | Formula | Color shade on cellulose fiber |
|---------|---------|-------------------------------|
| 18 | | Yellow |
| 19 | | Yellow |
| 20 | | Yellow |
| 21 | | Yellow |
| 22 | | Yellow |
| 23 | | Yellow |

| Example | Formula | Color shade on cellulose fiber |
|---|---|---|
| 24 | 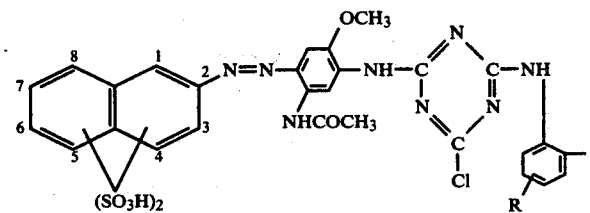 | Yellow |
| 25 | | Yellow |

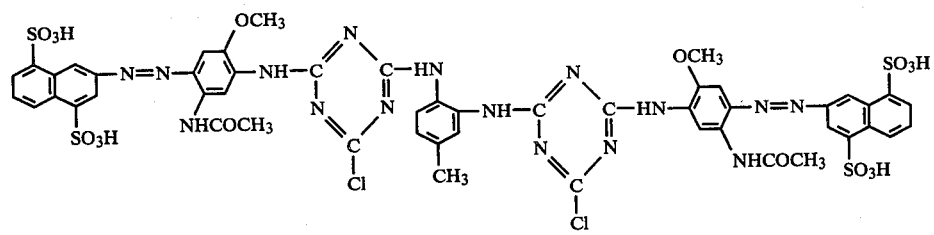

What is claimed is:

1. A reactive azo dyestuff which, in the form of free acid, is represented by the following formula:

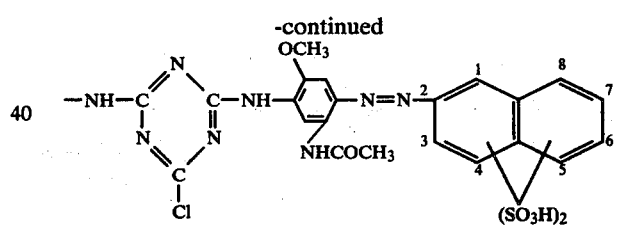

wherein R is hydrogen or methyl.

2. A reactive azo dyestuff, according to claim 1, which, in the form of free acid, the sulfonic acids attached to the naphtalene nuclei are bonded to the nuclei at the position of 4,8-,5,7- or 6,8-.

3. According to claim 1 a reactive azo dyestuff which, in the form of free acid, is represented by the following formula;

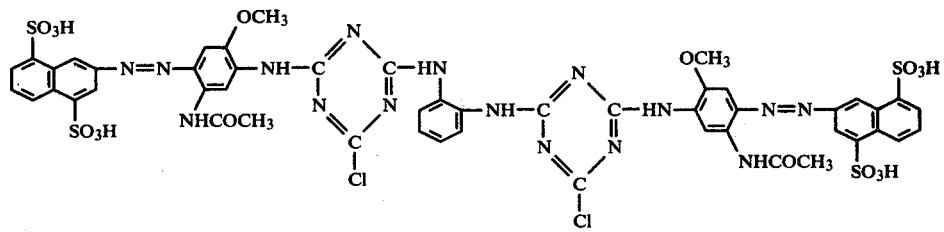

4. According to claim 1 a reactive azo dyestuff which, in the form of free acid, is represented by the following formula;